United States Patent Office.

IMPROVED MODE OF DEFECATING CANE JUICE.

LAWRENCE REID, OF NEW YORK, N. Y., AND DAVID LYMAN, OF MIDDLEFIELD, CONNECTICUT, ADMINISTRATOR OF THE ESTATE OF EDWARD H. SWIFT, DECEASED, ASSIGNORS TO PHINEAS L. ROBINSON AND JOSEPH H. PARSONS.

*Letters Patent No. 60,243, dated December 4, 1866; antedated November 29, 1866.*

SPECIFICATION.

TO ALL WHOM IT MAY CONCERN:

Be it known that we, LAWRENCE REID, of New York city, in the county and State of New York, and DAVID LYMAN, of Middlefield, in the county of Middlesex, in the State of Connecticut, administrator on the estate of EDWARD H. SWIFT, deceased, do hereby declare that the said REID and the said SWIFT were joint inventors of certain new and useful improvements in Defecating Sugar-Cane Juice with the use of acid, and we do hereby declare that the following is a full and exact description thereof.

This invention relates to the employment of acid in connection with a weak alkali, so as to remove the impurities with little danger of injuring the juice. This process introduces the acid first or before the alkali, and when fully carried out in the hot defecation alternately adds acid and alkali in small increments to the juice. The process always commences with acid and ends with alkali, or rather ends by preference with a preparation invented by the same parties, which is nearly neutral, but very slightly alkaline. The process may be conducted either with cold or hot juice. We prefer the cold.

We will now proceed to describe what we consider the best method of operating with oxalic acid and the proper accompanying material to make the cold defecation, copying liberally from a description prepared during the lifetime and with the approval of Mr. SWIFT.

We run the cane juice into a tank, say five feet deep, having previously strained it through wire gauze to separate as much woody fibre and extraneous matter as possible. Every seven hundred gallons of cane juice will require about one and one-quarter pounds of oxalic acid in crystals, dissolved in one gallon of water, and about six pounds of slaked lime, previously mixed with about three gallons of water, the proportions varying with the conditions under which the operation is conducted, as will be readily understood. We dissolve the oxalic acid in the gallon of water and then add it to the cane juice. After mixing well we slowly add the lime to bring the juice to a slightly alkaline state, so as to turn weak turmeric paper brown. We then allow the whole to settle, and draw off the clear liquor into our boilers, and afterward further settle or filter the remainder. To the defecated juice in the boiler we add about one-quarter of a pound of oxalic acid, previously dissolved, or only enough to make it neutral. We then bring to boil, skim, and add one pound of a prepared slightly alkaline phosphate of lime, invented by the same parties, to promote crystallization and prevent acidity. The mode of preparation of this latter material by lime and superphosphate of lime, so as to be peculiarly adapted for this use, is described in detail in a patent granted to us of even date herewith.

In operating our oxalic acid process for a hot defecation we would wish to state that we prefer the cold; but, considering the necessities of sugar manufacturing, we proceed to describe our oxalic acid and slaked lime hot defecation.

Having brought a boiler of five hundred gallons of cane juice to the boiling point, and skimmed it, we add two ounces of oxalic acid, previously dissolved in one pint of water, and immediately add a sufficiency of slaked lime, previously mixed with water, to render the whole slightly alkaline, as indicated by turning weak turmeric paper brown, then skim, and repeat the oxalic acid and slaked lime as above described, skim, and go on with acid and lime until about one pound of acid has been used, rendering the last operation on the juice as nearly neutral as possible; then, as a final operation, add one pound of the prepared alkaline phosphate of lime to promote crystallization.

In this process, from the small proportions of lime and acid used at any one time, we believe that we avoid the injury the sugar is liable to sustain from the action of either acids or alkaline substances in excess; and as the reaction of the lime upon the acid immediately produces a neutral salt, we insist that we are defecating with a nearly neutral body, that has the advantage of being slightly acid and alkaline alternately and causing a very complete defecation of the juice. We propose to use, under some circumstances, on account of the varying nature of cane juice, in addition to oxalic acid, some one or more of the slightly acid bodies set forth as defecators in patents issued to us bearing even date herewith; but we do not believe such combination of processes to be generally expedient. When such are used the quantity of oxalic acid may be correspondingly diminished. The varying nature of cane juice at different periods, and particularly on different estates, renders it desirable to vary the proportions of the materials considerably, which will be determined by the practical sugar boiler.

We obtain, as a general result, the production of from fifteen to thirty per cent. more sugar and of a better quality than usual, and the saving to the estates of the cost and trouble in the use of bone-black, and, when vacuum pans are employed, producing a sugar equal to that produced by bone-black.

Having now fully described this invention, what we claim as new, and as the invention of the said LAWRENCE REID and EDWARD H. SWIFT, deceased, and desire to secure by Letters Patent, is as follows:

We claim the mode herein described of defecating cane juice with acid and slaked lime, introducing some of the acid in advance of the lime, as herein specified.

LAWRENCE REID,
DAVID LYMAN.

Witnesses:
D. W. STETSON, } to L. R.
D. L. FREEBORN,
H. WOODWARD, } to D. L.
LYMAN A. MILLS,